United States Patent [19]

Davey

[11] Patent Number: 5,201,549
[45] Date of Patent: Apr. 13, 1993

[54] THERMAL ISOLATION COUPLING SYSTEM

[75] Inventor: Mark J. Davey, North Aurora, Ill.

[73] Assignee: Senior Engineering Investments, B.V., Amsterdam, Netherlands

[21] Appl. No.: 822,618

[22] Filed: Jan. 17, 1992

[51] Int. Cl.⁵ .............................................. F16L 37/00
[52] U.S. Cl. ...................................... 285/39; 385/423
[58] Field of Search ................... 285/39, 41, 319, 330, 285/913

[56] References Cited

U.S. PATENT DOCUMENTS

| | | | |
|---|---|---|---|
| 3,312,483 | 4/1967 | Leadbetter et al. | 285/423 |
| 3,334,661 | 8/1967 | Milette | 285/330 X |
| 4,405,160 | 9/1983 | Tyuuman | 285/41 X |
| 4,702,503 | 10/1987 | von Koch | 285/330 |
| 5,098,133 | 3/1992 | Glover | 285/39 X |

OTHER PUBLICATIONS

"1200 Report", published by Du Pont Automotive Products, 1989 pp. 2, 4, 5.

Primary Examiner—Richard E. Moore
Attorney, Agent, or Firm—Dick and Harris

[57] ABSTRACT

A thermal isolation coupling system for attaching a high-temperature fluid-bearing tube to an aperture in a housing, in which a separate low temperature flow is established. Locking means attaches the tube end to the housing, in a particular desired position relative to the aperture. A tube support member connects the tube end to the locking means and facilitates positioning of the extreme tip of the tube end in the low temperature flow, in substantially non-heat conducting isolation from the aperture and the housing.

12 Claims, 2 Drawing Sheets

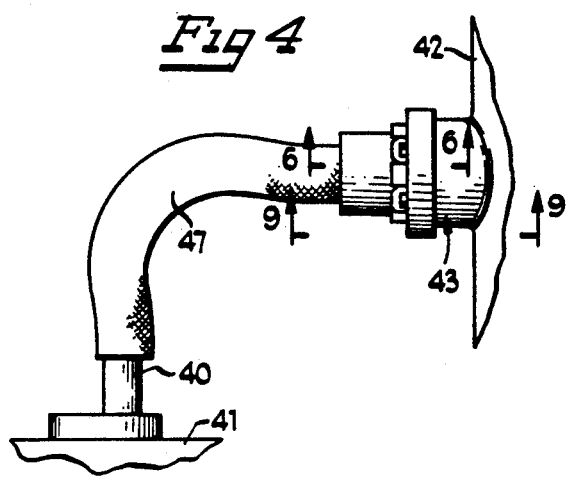
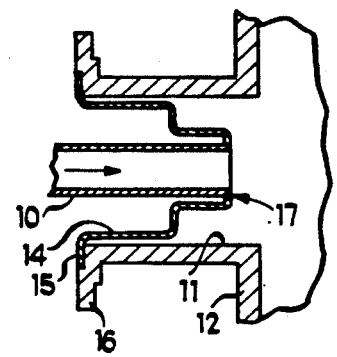
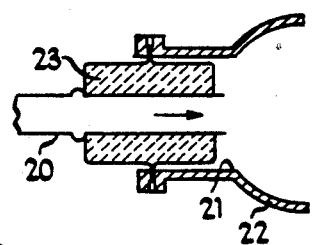
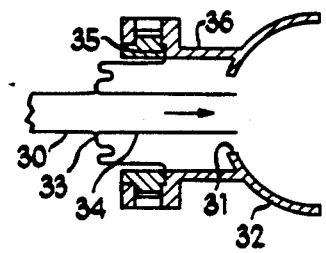
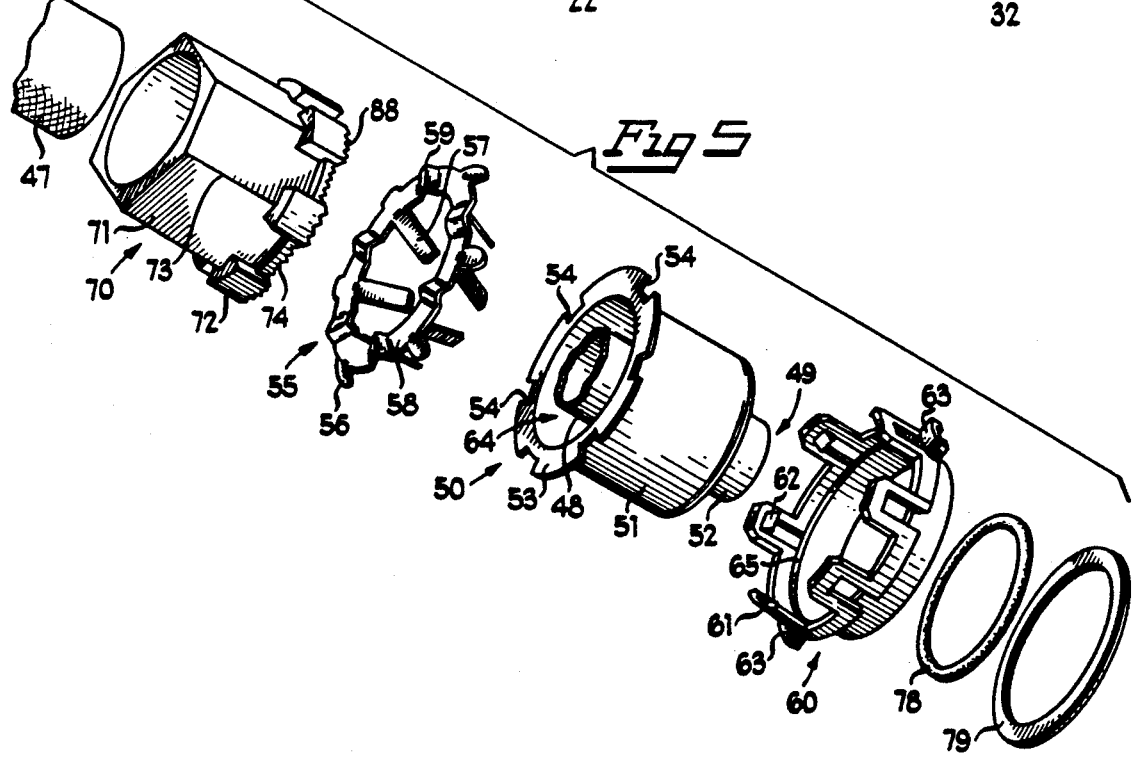

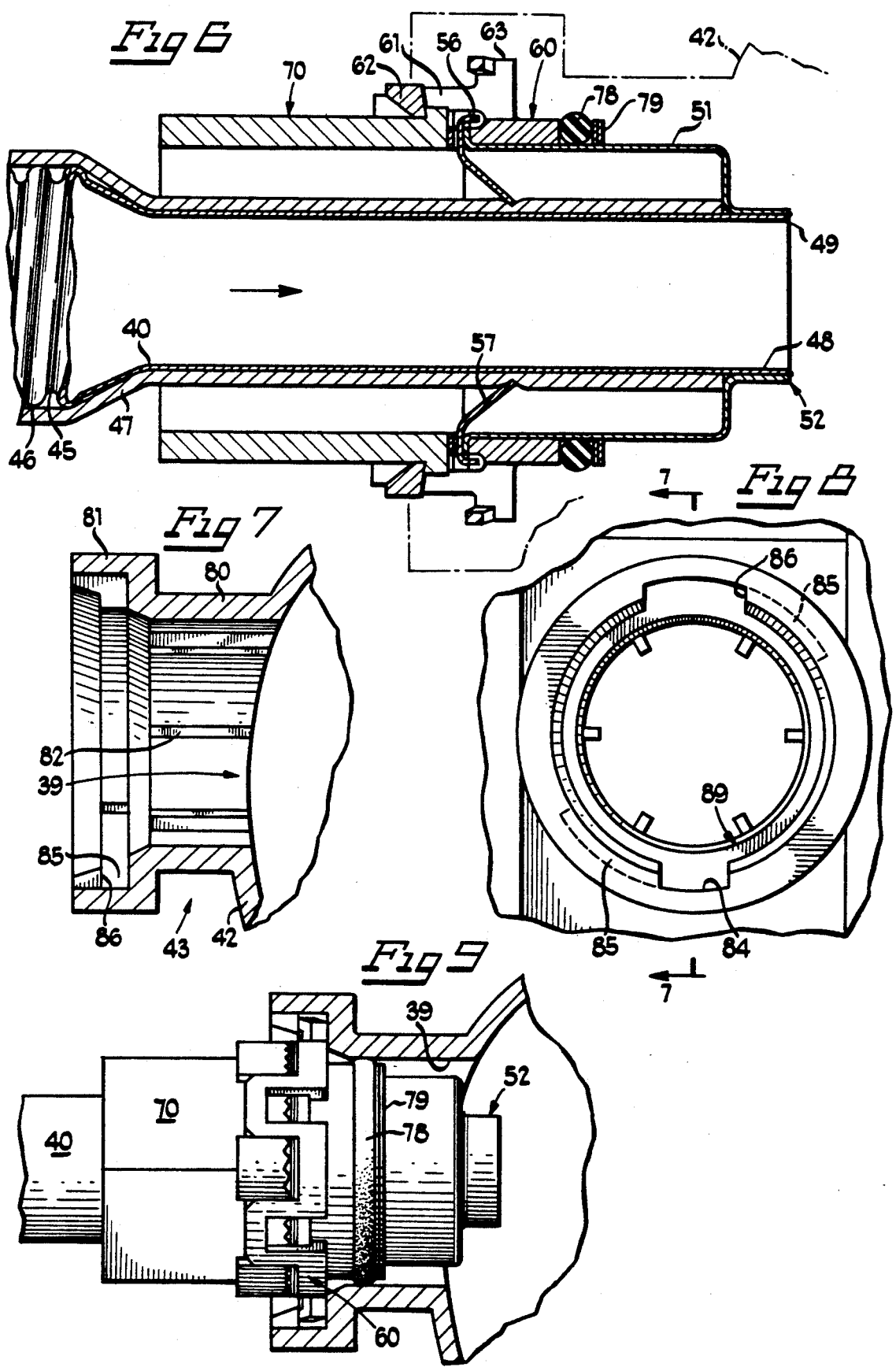

THERMAL ISOLATION COUPLING SYSTEM

BACKGROUND OF THE INVENTION

The present invention relates to coupling systems for transmission of fluids, and in particular to coupling systems for attaching a conduit for high temperature fluid to a housing in such a way that heat is not transferred from the high temperature conduit into the housing.

One environment in which such coupling systems has become important is the automotive industry. As part of the current trend of manufacturing automobiles with lighter construction, utilizing aluminum instead of steel, and plastic instead of metal and so on, it has become increasingly popular for designers to replace more and more metal parts with parts made from plastic material. Only recently, however, has it become possible to replace metal automotive engine components with plastic components, because of the various strength, durability and heat resistance characteristics which the particular components must possess. While high strength, high heat resistant plastic and ceramic materials do exist, such materials are extremely costly and are sometimes brittle, and are therefore not economically feasible. However, certain engine components can be replaced, if they are low strength requirement components which can be effectively isolated from high heat and temperature sources. These particular components can then be manufactured from relatively inexpensive thermoplastic materials such as ABS. Such inexpensive plastic components must be protected from temperatures that are in excess of approximately 350 degrees Fahrenheit.

One such automotive engine component which, among others, can be manufactured from inexpensive plastic material, if properly isolated, is the air intake manifold. Through the use of the proper gasketing or other suitable isolation technique, the main body of an air intake manifold housing can be effectively substantially thermally isolated from the remainder of an engine block. However, there exists one feature which is becoming increasingly prevalent in modern, fuel efficient, low emission engine, which presents particular difficulties with respect to isolation from heat. In order to improve the fuel efficiency and emissions quality of automobile engines, it has become common practice to direct hot exhaust gases from the exhaust manifold into the intake manifold, in order to elevate the temperature of the incoming air to improve the efficiency of the combustion process, as well as to combust unused fuel vapor which exists in all automobile exhaust. However, while the ambient air which is brought in to the air intake manifold may be, as much as 125 degrees Fahrenheit, the exhaust gases which are being recirculated in to the air intake manifold may have a temperature as high as 1300 degrees Fahrenheit. Such extreme temperatures would lead to the destructive transmission of heat from the exhaust gas recirculation (EGR) tube, which must be made of metal, into the portions of the housing to which the EGR tube is attached. Low temperature plastics would quickly begin to degrade or even melt or burn under prolonged exposure to such heat unless properly insulated from the EGR tube.

Various attempts have been made to provide for inexpensive adequate insulation between the hot EGR tube and the plastic housing. One such proposed solution is to provide a metal flange which centers the hot tube end within a much larger aperture in the housing. The flange, often in the shape of a cup, is then affixed to a cylindrical collar which extends from the housing, surrounding the aperture. However, since the flange or cup is manufactured from metal, the heat is simply transferred through the flange into the portion of the collar which makes contact with the flange. Although this transferred heat is slightly less intense than at the extreme end of the EGR tube, the transferred heat is still sufficient to cause the premature degradation and/or melting of the plastic surfaces which are in direct contact with the flange. Accordingly, it has been the practice to provide that portions of the plastic collar are replaceable and separable from the main housing body. Such replaceable portions are, in fact, designed to degrade and be replaced on a regular basis. Such a construction is undesirable from the standpoint of the cost and inconvenience of replacement of the removable portions.

Another proposed solution is to position a cylindrical insulator body between the hot EGR tube end and the collar portion of the housing. However, to provide significant effective insulation capabilities, high performance insulating materials must be used, as previously described, which are prohibitively expensive, and as well, may have other undesirable performance characteristics, such as brittleness, low durability, susceptibility to fatigue and so on.

It is accordingly desirable to provide a system for coupling a high temperature tube or conduit to a housing in such a way that the heat from the high temperature conduit is not transferred into the material of the housing itself, so that the housing may be manufactured from common or at least non-high performance material.

Another object of the invention is to provide such a thermal isolation coupling system, in which the actual coupling components themselves may further be fabricated from relatively inexpensive, low temperature, low performance materials.

These and other objects of the invention will become apparent in light of the present Specification, Claims and Drawings.

SUMMARY OF THE INVENTION

The present invention is directed to a thermal isolation coupling system for operably maintaining an end of a tube in substantially sealed insertably received attached alignment, within a housing aperture which has an inner surface and at least one engagement surface operably disposed adjacent the aperture. The housing further has a substantially atmospheric ambient temperature fluid flow established therein, while the tube has a substantially greater than atmospheric ambient temperature fluid flow directed therethrough into the housing. The thermal isolation coupling system operably promotes transfer of heat away from the tube to, in turn, reduce the heat of the tube where it is attached to the housing.

The thermal isolation coupling system comprises locking means operably associated with the tube end and cooperating with the housing to removably affix the tube end into a predetermined position relative to the aperture and the substantially atmospheric ambient temperature fluid flow. A tube support member, having an extreme tip, operably interconnects the tube end to the locking means. The tube support means is affixed at its extreme tip to the extreme tip of the tube end, with the tube support member circumferentially surrounding the tube end. The tube support member is further interlockingly received and circumferentially surrounded by the locking means at an end of the tube support member distal to the extreme tip thereof to enable positioning of the extreme tips of the tube end and of the tube support member, respectively, operably within the established substantially atmospheric ambient temperature air flow and to thermally isolate the tube support member, and in turn, the tube end from the inner surface of the aperture to substantially preclude heat conductive contact between the inner surface of the aperture and the tube support member. Sealing means are also operably associated with the tube support member and the locking means, to preclude escape of fluid from the substantially greater than atmospheric ambient temperature fluid flow from said aperture, and to facilitate the isolation of the tube support means.

The locking means includes a first locking member which operably circumferentially surrounds and is received by the distal portion of the tube support member. At least one engagement member is operably disposed on the first locking member for interlocking engagement with the at least one engagement surface. The locking means further includes at least one attachment member disposed on the first locking member and a second locking member, which has at least one attachment surface for cooperative interlocking releasable engagement with the at least one attachment member, so that when the at least one attachment member and the at least one attachment surface are brought into engagement, a portion of the distal end of the tube support member is retained between the first and second locking members.

In a preferred embodiment of the invention, the system also includes gripping means for engaging the tube support member and the locking means, to permit resistive relative rotational movement between the tube support member and the locking means. The gripping means includes a first gripping member engageable with the just-mentioned portion of the distal end of the tube support member, a first set of gripping contours arranged on the first gripping member, and a second set of gripping contours arranged on the second locking member, for engagement with the first set of gripping contours, when the first and second locking members are engaged.

In a preferred embodiment of the invention, the second locking member also includes a plurality of tool engagement surfaces arranged circumferentially around the second locking member.

Alignment means may also be provided, which are associated with the gripping means for facilitating centering of the tube end relative to the locking means and the distal end of the tube support member. The alignment means includes a plurality of alignment members which are arranged circumferentially around the first gripping member, and projecting radially inwardly therefrom.

The tube support member is to be formed, preferably, as a substantially cylindrical member, having first and second open ends, with the first open end disposed at the extreme tip of the tube support member. The second open end is disposed at the distal end, and has a diameter substantially greater than that of the tube end adjacent the distal end of the tube support member.

The tube support member is likewise preferably affixed to and in heat-conducting contact with the extreme tip of the tube end, and substantially only at said respective extreme tips of the tube end and the tube support member.

In a preferred embodiment of the invention, the first and second locking members are fabricated from relatively low temperature resistant thermoplastic material or the like.

The sealing means may be formed as a resilient sealing member arranged circumferentially around the tube support member, and configured to sealingly fit between the tube support member and the inner surface of the aperture. A resilient retainer member may also be circumferentially disposed around the tube support member.

BRIEF DESCRIPTION OF THE DRAWINGS

FIG. 1 is a side elevation, in section, of a prior art coupling system.

FIG. 2 is a side elevation, in section, of another prior art coupling system.

FIG. 3 is a side elevation, in section, of still another prior art coupling system.

FIG. 4 is a plan view of the thermal isolation coupling system attaching one end of a high temperature fluid to a housing.

FIG. 5 is an exploded perspective view of the various elements of the thermal isolation coupling system of the present invention.

FIG. 6 is a side elevation, in section, of the coupling system according to FIG. 5, assembled and in position within an aperture in a housing.

FIG. 7 is a side elevation, partially in section, of an aperture and surrounding structure, for which the present fluid coupling system may be configured.

FIG. 8 is side elevation, partly in section, of the aperture and surrounding structure according to FIG. 7.

FIG 9 is a side elevation, partly in section, showing the external structure of the thermal isolation coupling system according to FIG. 5.

DETAILED DESCRIPTION OF THE DRAWINGS

While this invention is susceptible of embodiment in many different forms, there is shown in the drawings and will be described herein in detail, a specified preferred embodiment, with the understanding that the present disclosure is to be considered as an exemplification of the principles of the invention and is not intended to limit the invention to the embodiment illustrated.

FIGS. 1 through 3 show three different prior art systems for positioning the end of a tube, carrying a high temperature a fluid flow, such as an exhaust gas recirculation (EGR) tube within an aperture in a housing, such as an intake manifold housing, in particular where the housing is fabricated from a high temperature sensitive material such as nylon or other thermal plastic material. Exhaust gases within an EGR tube are typically in a temperature range of 1200-1300 degrees Fahrenheit.

FIG. 1 shows tube 10 centered within aperture 11 of housing 12 by cup 14. Flange 15 of cup 14, however, is in direct contact with flange 16 of housing 12. Accordingly, heat from the incoming recirculated exhaust gases is transferred from the incoming flow, indicated by the arrow, into tube 10, through the annular joint 17, between tube 10 and cup 14, and along cup 14 to flange 15 and in turn into flange 16. There is a little opportunity for the heat being transferred into tube 10 to be dissipated as it is conducted into cup 14 and flange 14. Further, there is substantial common surface area between flanges 15 and 16. The heat accordingly will cause the premature degradation of the material of the housing in the general are of the aperture 11 and in particular in the region of flange 16, necessitating the complete replacement of the housing 12, which is typically a molded continuous unit.

FIG. 2 discloses another prior art coupling configuration in which tube 20 is centered within aperture 21 of housing 22 through the use of a insulator 23. Insulator 23 is typically configured from either a solid ceramic or plastic material. If the material is high-temperature resistant ceramic or plastic, while the usable life span of the insulator may be improved somewhat, the substantial increased cost of such materials is undesirable. Such high-temperature resistant materials would be necessary, since insulator 23 otherwise would also require replacement at short, intervals, due to the fact that the heat being transferred from the flow into tube 20 will tend to be transferred directly into insulator 23, and not be transferred elsewhere.

FIG. 3 shows a further coupling configuration in which tube 30 is aligned with aperture 31 of housing 32 through the use of a diaphragm 33 which has integrally formed therewith inwardly projecting tube portion 34. Heat from the high temperature fluid flow is transferred either from tube 30, or directly into tube portion 34, and then into diaphragm 33. Ultimately, the heat is transferred into the retaining portion 35 of collar 36 which surrounds aperture 31. Similarly to the prior art configuration of FIG. 1, the prior art configuration of FIG. 3 includes metal elements which are in direct heat conducting contact with the plastic surfaces of the housing.

It is the goal of Applicant's invention to provide a coupling system with significantly more effective thermal isolation than that provided in the above-described prior art systems. Applicant's invention provides, as described hereinafter, a coupling system which may be advantageously used, for example, to connect an EGR tube 40 (FIG. 4) from an exhaust housing 41 to an intake manifold housing 42 in such a manner that the heat from the high-temperature recirculated exhaust gases are not transferred from tube 40 into the plastic housing collar 43 surrounding aperture 39 (see FIG. 9), without requiring either the provision of costly high-temperature resistant insulating materials to separate the tube from the housing, or the fabrication of the housing itself from high-temperature resistant materials.

FIGS. 5-9 show the thermal isolation fluid coupling system 50 of Applicant's invention.

Exhaust gas recirculating tube 40 is typically configured, as shown in FIG. 6, as being formed from a central thin-walled metal tube 40, which may be fabricated from light gage heat resistant or corrosion resistant steel. Along its length, tube 40 may be provided with circumferential or spiral grooves 45 and ridges 46 to facilitate manipulation of tube 40 into any desired or required position. Insulation cover 47 prevents loss of heat from the exhaust gases through the sides of tube 40. Typically, insulation cover 47 is formed as a knit, woven or braided fabric cover made from an insulating fiber material. Tube 40 includes tube end 48 and extreme tip 49, which is to be positioned within and aligned with aperture 39 in housing 42.

Coupling system 50 is shown in exploded view in FIG. 5. Tube end 48 is shown surrounded by cup 51. Extreme tip 49 of tube end 48 is affixed to extreme tip 52 of cup 51, as indicated in FIG. 6. Flange 53 extends radially outwardly from the end of cup 51, opposite extreme tip 52. Flange 53 has a number of rectangular notches 54 arranged at regularly spaced intervals around its periphery. Notches 54 are configured to accommodate hooks 56 which are positioned at regular intervals around the periphery of retainer ring spring 55. Retainer ring spring 55 additionally has prongs 57 extending inwardly and at a substantial angle to the plane of main portion 58 of retainer ring spring 55. In the preferred embodiment of the invention prongs 57 and hooks 56 are arranged in one to one correspondence around the periphery of retainer ring spring 55, with a respective prong 57 and hook 56 positioned in radially aligned relation to each other. Positioned in between each respective prong 57 and hook 56 pair, are detents 59. In the preferred embodiment of the invention, detents 59 are positioned substantially midway between adjacent hook 56 and prong 57 pairs.

First locking ring 60 is formed as a short cylindrical annulus, configured to slidingly fit around the larger diameter portion of cup 51. Positioned at circumferentially spaced intervals around first locking ring 60 are a plurality of engagement members 61. A substantially wedge-shaped hook 62 projects inwardly from each engagement member 61. In addition, substantially c-shaped lock pins 63 emanate from opposite portions of first locking ring 60. Second locking ring 70 is substantially hexagonal shaped with substantially rectangular sides 71. Sector shaped projections 72 are arranged in uniformly circumferentially spaced positions around one end of second locking ring 70. Each projection 72 straddles the edge 73 between adjacent sides 71. Arcuate ledges 74 are positioned between adjacent projections 72, with the circumferential spacing between adjacent projections 72 configured to snugly accommodate engagement members 61. Coupler system 50 also includes O-ring 78 and split ring retainer 79.

In practice, the assembly and operation of coupling system 50 is illustrated in FIGS. 6-9. A desired length of tube 40 is prepared, and provided with insulation cover 47. Second locking ring 70 may then be fitted over tube end 48. Retainer ring spring 55 fits loosely juxtaposed to flange 53 of cup 51. The radial width of main portion 58 of retainer ring spring 55, in the preferred embodiment of the invention, is substantially equal to the radial width of flange 53. Prongs 57 are directed into the interior 64 of cup 51. First locking ring 60 slidingly fits over cup 51 with engagement members 61 pointing toward flange 53 and away from extreme tip 52. Engagement members 61 and hooks 62 are, in the preferred embodiment of the invention, configured so as to provide a diameter slightly less than that of the outside diameter of flange 53, so that engagement members 61 must be sprung outwardly slightly in order for flange 53 to pass hooks 62, so that flange 53 may be brought up against interior ledge 65 of first locking ring 60. The assembled cup 51, first locking ring 60, retainer ring spring 55, are then slid upon tube 40 and insulation cover 47. Preferably, prongs 57 are configured so that they will grippingly slide over cover 47, to enable the just described assembly to be pushed up a desired distance along tube 40, until extreme tip 52 of cup 51 and extreme tip 49 of tube end 48 can be aligned, as shown in FIG. 6. Extreme tips 52 and 49 can then be affixed together permanently, by any suitable method, such as welding, brazing, etc., so long as any heat applied is sufficiently controlled to prevent damage to first locking ring 60.

Second locking ring 70 may then be aligned with first locking 60 so that engagement members 61 are brought into registry with ledges 74. Preferably, detents 59 on retainer ring spring 55 are sized so that when first locking ring 60 and second locking ring 70 are pressed together, when hooks 62 have passed ledges 74, detents 59 of retainer ring spring 55 produce a compression fit, such that hooks 62 are being forced against ledges 74 and engagement members 61 are in tension. As a result of this construction, retainer member 55 is pressed against cup 51 and relative rotation between joined first locking ring 60 and second locking ring 70 is prevented. Relative rotation is permitted between cup 51 and second locking ring 70. Detents 59 of retainer ring spring 55 nest into teeth 88 of locking ring 70, which resist relative motion, but will allow rotational indexing with some minor torque applied, to allow assembled first and second locking rings 60 and 70 to rotate relative to tube 40, cup 51 and retainer ring spring 55, with a "ratcheting" effect. This effect permits the installation of coupling system 50, with tube end 48 affixed, after the other end of tube 40 has already been secured to the exhaust manifold 41, in that first and second locking rings 60 and 70 may be rotated to lock into housing 42, while tube 40, and in particular, tube end 48 remains or is held motionless. O-ring 78 and split ring retainer 79, the function of which are described hereinafter, slidingly fit about cup 51 so that O-ring 78 is abutted against first locking ring 60 and held in place by split ring retainer 79.

FIGS. 7, 8 and 9 depict a typical aperture configuration which may be provided in housing 42. Collar 43 projects outwardly from housing 42. Collar 43 includes first and second cylindrical portions 80 and 81, respectively. Cylindrical portion 80 may have longitudinally extending ridges 82 which project radially inwardly. Outer cylindrical portion 81 has an interior diameter which is greater than the interior diameter of cylindrical portion 80. Cup 51 of coupling system 50 is configured such that the outside of the diameter of the larger cylindrical portion of cup 51 is less than the inner diameter of cylindrical portion 80, with cup 51 having a clearance between it and ridges 82. Flange 53 of cup 51 has an outside diameter which is greater than the inside diameter of cylindrical portion 80, but is less than the internal diameter of cylindrical portion 81. The outside diameter of first locking ring 60 and second locking ring 70 are configured to be slightly less than the interior diameter of cylindrical portion 81, so that the assembled coupling system 50 can be insertingly received by collar 43.

Cylindrical portion 81 is additionally provided with longitudinally extending notches 84 and corresponding circumferentially extending slots 85 which intersect with notches 84. Lock pins 63 which extend from opposite portions of first locking ring 60, are configured to be received by notches 84. Upon rotation of coupling system 50, by applying torque to second locking ring 70, lock pins 63 move along slots 85. In order to assure that coupling system 50 is tightly held within collar 43, O-ring 78 and split ring retainer 79 have been provided. Split ring retainer 79, in addition to holding O-ring 78 against first locking ring 60, is configured to bear against the inner surface 89 of collar 43, the transition region between cylindrical portion 80 and cylindrical portion 81.

As can be seen from FIG. 5, lock pin 63 has a curved, C-shaped surface. When O-ring 78 and split ring retainer 79 are in place, and coupling system 50 is inserted into collar 43, ridges 82 are used to prevent O-ring 78 and split ring retainer 79 from being vibrated or worked off of cup 51 during operation of the vehicle. Instead, the sides of lock pins 63 are positioned so that edges 86, where slots 85 intersect notches 84, abut lock pins 63. Upon the further application of thrusting force and twisting force to coupling system 50, O-ring 78 is compressed and edges 86 ride up of the curved portions of lock pins 63, in a cam-follower type of movement, permitting lock pins 63 to move into slots 85. The curved surfaces of lock pins 63 may be configured to deform slightly, which can serve to prevent cracking or other damage to either of the locking rings and to enhance the locking action. O-ring 78, being compressed, exerts a thrusting force, pushing first locking ring 60 outwardly, in turn pressing lock pins 63 against the outer walls of slot 85, creating frictional resistance to further rotational movement of coupling system 50, in the absence of intentionally applied twisting force in the return direction.

Once the components of the present coupling system have been assembled, the configuration serves to thermally isolate the tube end 48, by centering tube end 48 within aperture 39. Further, cup 51 is prevented by first and second locking rings 60 and 70, and O-ring 78, from making heat conductive contact with collar 43 of housing 42. Split ring retainer 79 additionally only makes intermittent contact with collar 43, as a result of engine vibration, and so does not serve to transfer any significant amounts of heat from cup 51 to collar 43. The potential heat transfer at this location is also not significant since, the temperature of cup 51, where split ring retainer 79 is positioned, has been so significantly reduced, as described hereinafter.

To obtain the desired effect of transferring heat away from tube 40, in particular extreme tip 49 of tube end 48, cup 51, first locking ring 60 and second locking ring 70 have been configured so that once coupling system 50 is fully assembled and positioned within collar 43, extreme tip 52 of cup 51 extends beyond aperture 39 and into the established substantially atmospheric ambient temperature flow within housing 42.

Substantial cooling effect has been observed utilizing the above-described configuration of Applicant's invention. In particular, if the substantially greater than atmospheric ambient temperature fluid flow, within tube 40 is approximately 1300 degrees Fahrenheit, and if the substantially atmospheric ambient temperature flow established within the housing 42 is approximately 125 degrees Fahrenheit (approximating the heated air present over a highway on a 100 degrees Fahrenheit day), temperatures at extreme tip 52 have been observed to be approximately 1,240 degrees Fahrenheit. Due to the convection cooling effect of positioning the extreme tip 52 within the cooler air flow, temperatures of approximately 300 degrees Fahrenheit have been observed at a position midway along the longitudinal length of cup 51, and temperatures on the inward cylindrical surface of second locking ring 70 of 200 to 250 degrees Fahrenheit have been maintained. Such substantial cooling enables the use of relatively inexpensive plastic material to be used for the fabrication of the first and second locking rings 60 and 70, respectively, as well as the use of non-high temperature resistant elastomeric material for O-ring 78. In addition, the molded plastic material from which housing 42 is fabricated, need not be high temperature resistant and may be formed as a single molded member.

The particular configuration of cup 51, first locking ring 60, second locking ring 70 are dependent upon the necessary and/or desired configuration of collar 43 which surrounds aperture 39 of housing 42. However, the inventive concept of positioning extreme tip 49 of tube 40 into the established lower temperature air flow within housing 42 is not affected by the particular configuration of coupling system 50 which is used to achieve the desired positioning. Additionally, the configuration of the various described elements may be varied without departing from the inventive desired configuration which precludes direct heat conducting contact between high temperature metal portions of tube end 48 or of cup 51, and instead provides only for the intermittent limited contact from split ring retainer 79, at which position, the temperature has been substantially reduced to values which relatively inexpensive, non-high temperature resistant plastic materials can withstand.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A thermal isolation coupling system for operably maintaining an end of a tube in substantially sealed insertably received attached alignment, within a housing aperture, having an inner surface, and having at least one engagement surface operably disposed adjacent said aperture, and said housing further having a substantially atmospheric ambient temperature fluid flow established therein, wherein the tube has a substantially greater than atmospheric ambient temperature fluid flow directed therethrough into said housing, said thermal isolation coupling system operably promoting transfer of heat away from the tube to, in turn, reduce the heat of said tube where it is attached to said housing, said thermal isolation coupling system comprising:

locking means operably associated with the tube end and cooperating with the housing to removably affix the tube end into a predetermined position relative to the aperture and the substantially atmospheric ambient temperature fluid flow;

a tube support member, having an extreme tip, operably interconnecting the tube end to the locking means, said tube support means being affixed at said extreme tip thereof to an extreme tip of the tube end, said tube support member circumferentially surrounding said tube end, the tube support member further being interlockingly received and circumferentially surrounded by the locking means at an end of the tube support member distal to the extreme tip thereof to enable positioning of the extreme tips of the tube end and of the tube support member, respectively, operably within said established substantially atmospheric ambient temperature air flow and to thermally isolate said tube support member, and in turn, said tube end from said inner surface of said aperture to substantially preclude heat conductive contact between said inner surface of said aperture and said tube support member; and sealing means, operably associated with said tube support member and said locking means, for precluding escape of fluid from said substantially greater than atmospheric ambient temperature fluid flow from said aperture, and for facilitating said isolation of said tube support means.

2. The system according to claim 1 wherein said locking means further comprises:

a first locking member, operably circumferentially surrounding and received by said distal portion of said tube support member, at least one engagement member operably disposed on said first locking member for cooperative interlocking engagement with said at least one engagement surface.

3. The system according to claim 2 wherein said locking means further comprises:

at least one attachment member is operably disposed on said first locking member; and a second locking member, having at least one attachment surface operably disposed thereon for cooperative interlocking releasable engagement with said at least one attachment member, such that when said at least one attachment member and said at least one attachment surface are brought into said cooperative interlocking engagement, a portion of said distal end of said tube support member is grippingly retained between said first and second locking members.

4. The system according to claim 3 further comprising:

gripping means for operably engaging said tube support member and said locking means to permit resistive relative rotational movement therebetween.

5. The system according to claim 4 wherein said gripping means comprises:

a first gripping member operably engageable with said portion of said distal end of said tube support member;

a first set of resilient gripping contours operably arranged on said first gripping member; and a second set of gripping contours, operably arranged on said second locking member, for operable engagement with said first set of gripping contours, when said first and second locking members are interlockingly engaged.

6. The system according to claim 3 wherein said second locking member further comprises a plurality of tool engagement surfaces arranged circumferentially around said second locking member to facilitate releasable affixation of said coupling system, when assembled, to said housing.

7. The system according to claim 4 wherein said gripping means further comprises alignment means operably associated with said gripping means for facilitating centering of said tube end relative to said locking means and said distal end of said tube support member.

8. The system according to claim 7 wherein said alignment means comprises a plurality of alignment members arranged circumferentially around said first gripping member, and projecting radially inwardly therefrom.

9. The system according to claim 1 wherein said tube support member comprises a substantially cylindrical member, having first and second open ends, said first open end disposed at said extreme tip thereof, and having a diameter substantially equal to that of said extreme tip of said tube end, said second open end, disposed at said distal end, and having a diameter substantially greater than that of the tube end adjacent said distal end of said tube support member.

10. The system according to claim 9 wherein said tube support member is affixed to and in heat-conducting contact with said tube end, only at said respective extreme tips of said tube end and said tube support member.

11. The system according to claim 3 wherein said first and second locking members are fabricated of relatively low temperature resistant thermoplastic material.

12. The system according to claim 9 wherein said sealing means comprises:

a resilient sealing member circumferentially disposed around said tube support member and operably configured to sealingly fit between said tube support member and said inner surface of said aperture; and a resilient retainer member circumferentially disposed about said tube support member to retain said resilient sealing member on said tube support member in a particular desired position thereon.

* * * * *

UNITED STATES PATENT AND TRADEMARK OFFICE
CERTIFICATE OF CORRECTION

PATENT NO. : 5,201,549
DATED : April 13, 1993
INVENTOR(S) : Mark John Davey

It is certified that error appears in the above-identified patent and that said Letters Patent is hereby corrected as shown below:

| | |
|---|---|
| Col. 4, Line 35 | Insert --a-- after "is" |
| Col. 4, Line 37 | Insert --.-- after "Fig" |
| Col. 5, Line 6 | Delete "are" and instead insert --area-- |
| Col. 5, Line 20 | Delete "," after "short" |

Signed and Sealed this

Sixteenth Day of August, 1994

Attest:

BRUCE LEHMAN

*Attesting Officer*     *Commissioner of Patents and Trademarks*